(12) United States Patent
Harrison et al.

(10) Patent No.: US 9,380,534 B2
(45) Date of Patent: Jun. 28, 2016

(54) SYSTEM AND METHOD FOR SELECTING A POWER EFFICIENT NETWORK INTERFACE

(75) Inventors: Ryan James Harrison, Kitchener (CA); Seyed Behdad Esfahbod MirHosseinZadeh Sarabi, Toronto (CA); Jonathan Foster Kliegman, Kitchener (CA); Kevin Glen Roy Greer, Mississauga (CA); Wojciech Baranowski, Gdynia (PL); Fady Samuel, Kitchener (CA); Kevin Anthony Ellis, Kitchener (CA)

(73) Assignee: Google Inc., Mountain View, CA (US)

( * ) Notice: Subject to any disclaimer, the term of this patent is extended or adjusted under 35 U.S.C. 154(b) by 1043 days.

(21) Appl. No.: 13/491,489

(22) Filed: Jun. 7, 2012

(65) Prior Publication Data

US 2015/0201377 A1 Jul. 16, 2015

(51) Int. Cl.
*H04L 29/10* (2006.01)
*H04W 52/02* (2009.01)

(52) U.S. Cl.
CPC ...... *H04W 52/0229* (2013.01); *H04W 52/0277* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 5,801,970 A | 9/1998 | Rowland et al. | |
| 6,494,831 B1 | 12/2002 | Koritzinsky | |
| 6,614,769 B1 | 9/2003 | Eteminan et al. | |
| 6,917,850 B2 | 7/2005 | Kamishio | |
| 7,203,517 B2 | 4/2007 | Shimoda et al. | |
| 7,479,943 B1 | 1/2009 | Lunsford et al. | |
| 7,793,316 B2 | 9/2010 | Mears et al. | |
| 7,940,206 B2 | 5/2011 | Nohara et al. | |
| 8,862,715 B1 | 10/2014 | Tom et al. | |
| 2003/0126232 A1* | 7/2003 | Mogul | G06F 17/30902 709/219 |
| 2004/0100923 A1* | 5/2004 | Yam | 370/328 |

(Continued)

FOREIGN PATENT DOCUMENTS

| | | |
|---|---|---|
| EP | 2413635 B1 | 9/2012 |
| EP | 2575398 A1 | 4/2013 |

(Continued)

OTHER PUBLICATIONS

Joe, Inwhee et al., Abstract of "A Network Selection Algorithm considering Power Consumption in Hybrid Wireless Networks", retrieved from http://ieeexplore.ieee.org, Aug. 14, 2013, 2 pages.

(Continued)

*Primary Examiner* — Huy D Vu
*Assistant Examiner* — Hong Shao (57) ABSTRACT

A system and method for selecting a power efficient network interface are provided. One or more network interfaces for data transfer are detected on an electronic device. An active network interface from the one or more network interfaces, where the active network interface is active for data transfer, is identified. One or more power profiles corresponding to the one or more network interfaces are obtained. A power efficient network interface for data transfer from the one or more network interfaces based on the one or more obtained power profiles is determined. In a case where the determined power efficient network interface is not the active network interface, the power efficient network interface is activated for data transfer; data transfer by the active network interface is suspended after the power efficient network interface has been activated.

26 Claims, 4 Drawing Sheets

(56) References Cited

U.S. PATENT DOCUMENTS

| | | |
|---|---|---|
| 2004/0157624 A1 | 8/2004 | Hrastar |
| 2004/0254767 A1 | 12/2004 | Merkin et al. |
| 2006/0175753 A1 | 8/2006 | MacIver et al. |
| 2008/0125103 A1 | 5/2008 | Mock |
| 2008/0125163 A1* | 5/2008 | Chi et al. .................. 455/550.1 |
| 2009/0006522 A1 | 1/2009 | Kim et al. |
| 2009/0327478 A1 | 12/2009 | Krause et al. |
| 2010/0081406 A1 | 4/2010 | Tan et al. |
| 2010/0098055 A1 | 4/2010 | Kutt et al. |
| 2010/0145479 A1 | 6/2010 | Griffiths |
| 2010/0199197 A1 | 8/2010 | Faletski et al. |
| 2010/0255856 A1 | 10/2010 | Kansal et al. |
| 2011/0086638 A1* | 4/2011 | Medapalli .................... 455/436 |
| 2011/0131506 A1 | 6/2011 | Calissendorff |
| 2011/0215966 A1 | 9/2011 | Kim et al. |
| 2013/0107794 A1 | 5/2013 | Yamada |

FOREIGN PATENT DOCUMENTS

| | | |
|---|---|---|
| WO | 2008/043718 A1 | 4/2008 |
| WO | 2008043718 A1 | 4/2008 |

OTHER PUBLICATIONS

Joe, et al., Abstract of "A Network Selection Algorithm considering Power Consumption in Hybrid Wireless Networks", retrieved from http://ieeexplore.ieee.org, Aug. 14, 2013, 2 pages.

Non-Final Office Action from U.S. Appl. No. 13/081,216, mailed Aug. 27, 215, 26 pages.

* cited by examiner

SYSTEM AND METHOD FOR SELECTING A POWER EFFICIENT NETWORK INTERFACE

FIELD

The subject technology generally relates to network interfaces, and in particular, relates to selecting a power efficient network interface.

BACKGROUND

Electronic devices may support one or more network interfaces for communication with other electronic devices and/or one or more servers. Where an electronic device supports multiple network interfaces, a network interface that is running on the electronic device may consume more power than another network interface that is in standby mode or power off.

SUMMARY

The disclosed subject technology relates to a computer-implemented method for selecting a power efficient network interface. The method comprises detecting, on an electronic device, one or more network interfaces for data transfer. The method further comprises identifying an active network interface from the one or more network interfaces, wherein the active network interface is active for data transfer. The method further comprises obtaining one or more power profiles corresponding to the one or more network interfaces. The method further comprises determining a power efficient network interface for data transfer from the one or more network interfaces, based on the one or more obtained power profiles. In a case where the determined power efficient network interface is not the active network interface, the method further comprises activating the power efficient network interface for data transfer; and suspending data transfer by the active network interface, after the power efficient network interface has been activated.

The disclosed subject matter further relates to a system for selecting a power efficient network interface. The system comprises one or more processors, and a machine-readable medium comprising instructions stored therein, which when executed by the processors, cause the processors to perform operations comprising detecting, on an electronic device, one or more network interfaces for data transfer. The operations further comprise identifying an active network interface from the one or more network interfaces, wherein the active network interface is active for data transfer. The operations further comprise obtaining one or more power profiles corresponding to the one or more network interfaces, wherein the one or more power profiles comprise the instantaneous power consumption values of the corresponding one or more network interfaces. The operations further comprise determining a power efficient network interface for data transfer from the one or more network interfaces, based on an instantaneous power consumption value of the network interface. In a case where the determined power efficient network interface is not the active network interface, the operations further comprise activating the power efficient network interface for data transfer; and suspending data transfer by the active network interface after the power efficient network interface has been activated.

The disclosed subject matter further relates to a machine readable medium comprising instructions stored therein, which when executed by a system, cause the system to perform operations comprising detecting, on an electronic device, one or more network interfaces for data transfer. The operations further comprise identifying an active network interface from the one or more network interfaces, wherein the active network interface is active for data transfer. The operations further comprise obtaining one or more power profiles corresponding to the one or more network interfaces comprising obtaining a hardware calibration of power drain across the network interface and a projection of power consumption by the network interface wherein the one or more power profiles corresponding to the one or more network interfaces comprise the instantaneous power consumption values of the corresponding one or more network interfaces. The operations further comprise determining a power efficient network interface for data transfer from one or more network interfaces, based on an instantaneous power consumption value of the network interface. In a case where the determined power efficient network interface is not the active network interface, the operations further comprise activating the power efficient network interface for data transfer, and suspending data transfer by the active network interface after the power efficient network interface has been activated.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology may run on electronic devices (e.g., smartphones, laptop computers, tablet computers, PDAs, desktop computers, etc.) that support one or more network interfaces including WiFi, worldwide interoperability for microwave access (WiMax), 3rd generation mobile telecommunications (3G), code division multiple access (CDMA), Ethernet, etc. The electronic devices may include hardware components (e.g., chipsets, controllers, antennas, etc.) and software for the one or more network interfaces. Each of the one or more network interfaces may allow an electronic device to transmit, and/or receive data.

The subject technology may detect the one or more network interfaces, and may identify each of the one or more network interfaces' respective status (e.g., whether a particular network interface is powered down, on standby mode, actively transferring data, etc.). For example, the subject technology may determine that WiFi is active, WiMax is on standby mode and CDMA is powered off. The subject technology may determine the one or more network interfaces' respective theoretical bandwidth limit. The subject technology may also determine if any of the one or more network interfaces has an imposed bandwidth limit.

The subject technology may obtain a power profile (e.g., instant power consumption level, power consumption level over a period of time, etc.) for each of the one or more network interfaces. Power profiles may be based on hardware calibrations (e.g., measuring potential difference across one or more resistors connected to a WiFi antenna and/or WiFi chipset, etc.). For example, where a network interface is actively transferring data, a measurement of power consumption of the active network interface may be determined by measuring potential difference across one or more resistors connected to the antenna for the active network interface. The one or more resistors may be part of the antenna assembly. The one or more resistors may also be added to the antenna assembly for making one or more calibrations.

Power profiles may also be based on a combination of measured and/or projected information, such as rate of data transfer, signal strength, network congestion, data segment size, etc. A power profile of a network interface can include a compilation (e.g., a table, a chart, a list, etc.) of projected information that is related to the power consumption of the network interface. For example, a power profile of a network interface may include a table of projected values. Examples of projected values of the network interface may include previously measured power consumption value of the network interface at the network interface's current signal strength, theoretical power consumption value of the network interface at the network interface's current signal strength, previously measured power consumption of the network interface operating at the current rate of data transfer, theoretical power consumption value of the network interface operating at the current rate of data transfer, etc. The subject technology may generate a compilation of projected information for each of the network interfaces. The projected information of the network interfaces may be updated each time the process for selecting a power efficient network interface is repeated.

Where it is not possible and/or practical to measure a power profile of an active network interface through hardware calibrations, power profile of the active network interface may be obtained based on measured and/or projected information. Where a network interface is not actively transferring data, a projection of power profile of the non-active network interface may also be obtained based on measured and/or projected information. The projected information of the non-active network interface may also be based on rates of data transfer, signal strength, network congestion, data segment size, laboratory measurements, etc. This can allow the subject technology to project power profiles for one or more non-active network interfaces even where hardware calibrations are not possible. A powered down network interface may be brought to standby mode so a projection of power consumption of the powered down network interface may be obtained.

The power profile for a non-active network interface may also include projections for power cost associated with the electronic device entering into a "hand off" mode, where the non-active network interface is activated, and data transfer by the active network interface is suspended after activation of the non-active network interface and data transfer is fully handled by the newly activated network interface. Power cost associated with a "hand off" mode may include power used to activate an non-active network interface, power used to maintain data transfer while the non-active network interface is being activated, power used to deactivate one or more network interfaces, etc. Power cost associated with a "hand off" mode may differ depending on the network interfaces that are engaged in the "hand off" mode. In one example, the power cost associated with a "hand off" mode between WiFi and WiMax may be different than power cost associated with a "hand off" mode between WiFi and CDMA. Furthermore, power cost associated with a "hand off" mode may also depend on the location of the electronic device.

Power profiles of one or more network interfaces are compared to determine a power efficient network interface for data transfer. The power efficient network interface may be a network interface that consumes a least amount of power for data transfer at a particular geographical location at a particular time, where power cost associated with a "hand off" mode is accounted for. Where one of the one or more network interfaces is active, the power profile of the active network interface may be compared with the respective power profiles of non-active network interfaces to determine whether the active network interface is the power efficient network interface. In order for a non-active network interface to be considered as the power efficient network interface, power consumption level by the non-active network interface may be required to be below the power consumption level of an active network interface by a threshold value. The threshold value may be based on power cost associated with entering the "hand off" mode. Different network interfaces may have different threshold values. Furthermore, in order for a non-active network interface to be considered as the power efficient network interface, the non-active network interface may be required to have sufficient bandwidth to handle data transfer required by the electronic device. For example, if a user of the electronic device is streaming a movie, the non-active network interface may be considered as the power efficient network interface only if the non-active network interface has a theoretical bandwidth that can handle streaming the movie and not have any imposed bandwidth limitation (e.g., a bandwidth cap) that restricts the movie from being streamed on the electronic device. Where none of the non-active network interfaces have power consumption levels below the power consumption level of the active network interface by the threshold value, the active network interface is considered the power efficient network interface.

In a case where the determined power efficient network interface is not the active network interface, the electronic device enters into a hand off mode. Where data transfer is in progress during hand off mode, the power efficient network interface and the active network interface may concurrently transfer data until data transfer is fully established by the power efficient network interface. At that point, data transfer by the active network interfaces may be suspended.

The process for selecting a power efficient network interface may be repeated while the electronic device is in operation. The frequency of repeating this process is determined by a number of factors including power cost associated with the process for selecting a power efficient network interface as well as interruption of data transfer during this process.

Figure 1:
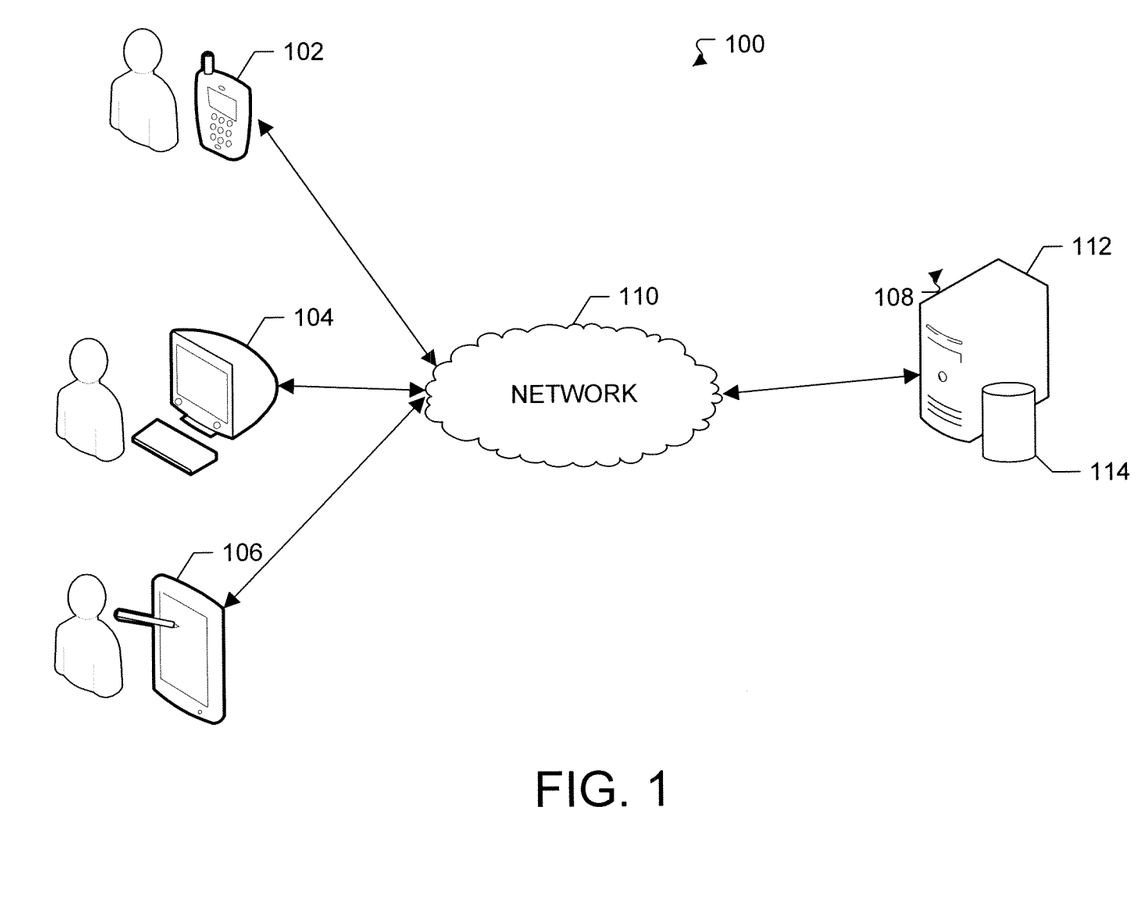
FIG. 1 illustrates an example network environment for selecting a power efficient network interface.

FIG. 1 illustrates an example distributed network environment for selecting a power efficient network interface. A network environment 100 includes a number of electronic devices 102, 104, and 106 communicably connected to a server 108 by a network 110. Server 108 includes a processing device 112 and a data store 114. Processing device 112 executes computer instructions stored in data store 114, for example, to provide web data for a web site to electronic devices 102, 104, and 106.

In some example aspects, each of the electronic devices 102, 104, or 106 may include any machine with hardware and software to support one or more network interfaces. Electronic devices 102, 104, and 106 can be mobile devices (e.g., smartphones, tablet computers, PDAs, and laptop computers), portable media players, desktop computers or other appropriate computing devices. In the example of FIG. 1, electronic device 102 is depicted as a smartphone, electronic device 104 is depicted as a laptop computer, and electronic device 106 is depicted as a tablet computer.

In some example aspects, electronic device 102, 104, or, 106 detects, on the electronic device, one or more network interfaces for data transfer. The one or more network interfaces may include WiFi, WiMax, 3G, CDMA Ethernet, etc. Furthermore, the electronic device 102, 104, or 106 identifies an active network interface from the one or more network interfaces, where the active network interface is active for data transfer with server 108 through network 110.

Furthermore, the electronic device, 102, 104, or 106 obtains one or more power profiles corresponding to the one or more network interfaces. The power profile of a network interface may be obtained by a hardware calibration of power drain across the network interface. For example, power drain across the network interface may be based on the potential difference across a resistor connected to the network interface and based on the resistance value of the resistor. A power profile of a network interface may also include a projection of power consumption by the network interface. The projection of power consumption may be based on signal strength of the network interface, the network interface's rate of data transfer, data segment size, congestion of the network interface, etc. A power profile of a network interface may include the network interface's instantaneous power consumption value. The power profile may also include the network interface's power consumption value over a period of time.

The electronic device 102, 104, or 106 determines a power efficient network interface for data transfer based on the one or more obtained power profiles. Where no network interface is active for data transfer, the instantaneous power consumption values of the one or more network interfaces are compared, and the network having the least instantaneous power consumption value is determined to be the power efficient network. In a case where a network interface is the active network interface, instantaneous power consumption values of the one or more network interfaces are compared, and if a non-active network interface has the lowest instantaneous power consumption value among instantaneous power consumption values corresponding to the one or more network interfaces, and if the instantaneous power consumption value of the non-active network interface is lower than the active network interface's instantaneous power consumption value by a threshold value, then the non-active network interface is designated as the power efficient network interface. Alternatively, the active network interface is designated as the power efficient network interface if none of the non-active network interfaces has an instantaneous power consumption value that is lower than the active network interface's instantaneous power consumption value by the threshold value. The threshold value may be based on power cost associated with activating the non-active network interface, and power cost associated with suspending data transfer by the active network interface that is not the power efficient network.

Furthermore, in a case where the determined power efficient network interface is not the active network interface, the electronic device 102, 104, or 106 may activate the power efficient network interface for data transfer, and suspend data transfer by the active network interface after the power efficient network interface has been activated.

The detecting, the identifying, the obtaining, the determining, the activating and the suspending are performed by an application running on the electronic device and may be repeatedly performed by an application running on the electronic device. The detecting, the identifying, the obtaining, the determining, the activating and the suspending are performed by an application running on the electronic device and may be repeatedly performed at a predetermined rate.

Server 108 may be any system or device having a processor, memory, and communications capability for providing messaging recommendations for electronic messaging. Server 108 may be a single computing device such as a computer server. Server 108 may also represent more than one computing device working together to perform the actions of a server computer.

Server 108 includes a processing device 112 and a data store 114. Processing device 112 executes computer instructions stored in a computer-readable medium, for example, to provide web data to electronic device 102, 104, or 106. Data store 114, contains the provided web data as well as other web data which may be transmitted to the electronic device 102, 104, or 106.

Network 110 can include, for example, any one or more of a cellular network, a satellite network, a personal area network (PAN), a local area network (LAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
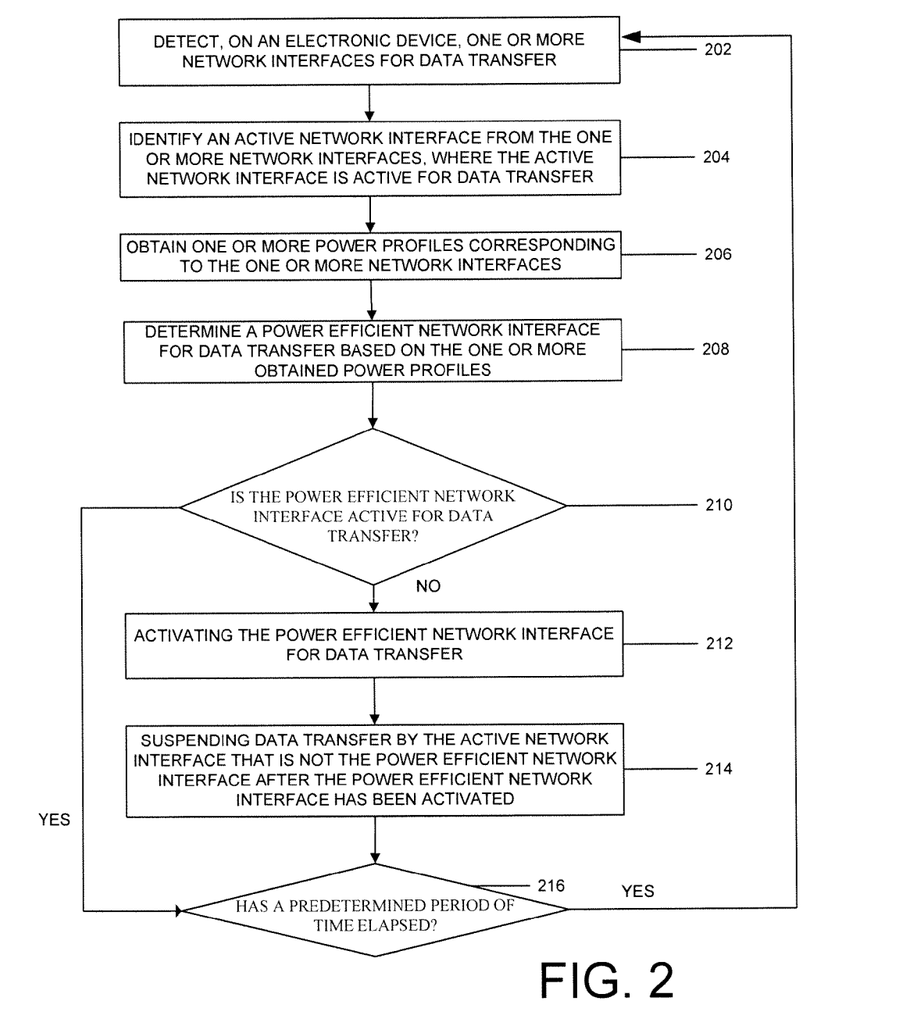
FIG. 2 illustrates an example process for selecting a power efficient network interface.

FIG. 2 illustrates an example process for selecting a power efficient network interface. An electronic device detects on the electronic device, one or more network interfaces for data transfer in step 202. Each of the network interfaces contains one or more hardware components (e.g., chipset, antenna, etc.). Example network interfaces include WiFi, WiMax, 3G, 4G, CDMA, GSM, Ethernet, etc. One or more applications (e.g., a system application) running on the electronic device may detect for network interfaces of the electronic device.

In step 204, the electronic device identifies a network interface from the one or more network interfaces is an active network interface where the active network interface is active for data transfer. A network interface may have several modes of operation. The network interface may be in a off power mode where the network interface does not draw any power from the electronic device. The network interface may be on standby mode where the network interface consumes power but does not engage any data transfer. The network interface may also be active for data transfer, where the network operates as a transceiver between the electronic device and the network. One or more applications (e.g., a system application) running on the electronic device may determine whether a network interface of the one or more network interfaces is an active network interface. Furthermore, the electronic device may also determine each of the network interfaces' respective theoretical bandwidth limit. The electronic device may also determine if any of the network interfaces has an imposed bandwidth limit.

In step 206, the electronic device obtains one or more power profiles corresponding to the one or more network interfaces. For example, where the electronic has detected that the electronic device provides three network interfaces WiFi, WiMax and CDMA respectively, the electronic device may generate three power profiles, one for WiFi, one for WiMax and one for CDMA. One or more applications running on the electronic device may obtain one or more power profiles corresponding to the one or more network interfaces.

A power profile of a network interface may be obtained by a hardware calibration of power drain across the network interface. A calibration of power drain may be obtained by determining a resistance value of a component of the network interface (e.g., a resister) and/or connected to the network interface and measuring the potential difference across the component. A resistor may also be connected to a component of the network interface (e.g., a antenna) and a calibration of power drain across the network interface may be measured by determining the resistance value of the resistor and the potential difference across the resistor. For example, a resistor having a known resistance value may be connected to a WiFi antenna and a hardware calibration of power drain can be obtained by measuring the potential difference across the resistor.

A power profile of a network interface may also be obtained through a projection of power consumption of the network interface. Power projection of the network interface may be based on signal strength of the network interface. Magnitude of power consumption by a network interface may be inversely proportional to the network's signal strength. Where the network's signal strength is determined, an algorithm based on inverse proportionality of power consumption and signal strength may be used to project the power consumption of the network interface having a specific signal strength. Furthermore, the projection of power consumption may also be based on prior usage of the network interface under similar conditions. For example, power consumption of a network interface having a particular signal strength and performing a specific task (e.g., transmitting a video) may be similar to power consumption of the network having a similar signal strength and performing a similar task.

Projection of power consumption by a network interface may also be based on rate of data transfer. Furthermore, projection of power consumption by a network interface may also be based on data segment size. For example, where the network interface is transmitting a data segment (e.g., a media upload) at a constant rate, a projection of power consumption by the network to complete transmission of the data segment may be determined based on the size of the data segment and the transmission rate. Furthermore, projection of power consumption by a network interface may also be based on network congestion. Where a network congestion occurs, projection of power consumption may take into account of additional power consumption by the network interface due to decreased data transfer rate, queuing delay, blocked data transfer, etc.

Projection of power consumption by a network interface may also be based on the network interface's rate of successful data transfer. In one example, the network interface's rate of successful data transfer is based on a ratio of a theoretical number of data packets needed by the network interface to successfully transmit a data segment (e.g., a media upload) to an actual number of data packets transmitted by the network interface for transmitting the data segment. The theoretical number of data packets needed by the network interface to successfully transmit the data segment assumes that each data packet associated with the data segment is successfully transmitted. Where the network interface suffers a data packet loss and re-transmits the data packet, the network interface's rate of successful data transfer decreases as a result of a need to re-transmit the data packet. In a case where the network interface uses a sliding window protocol (e.g., TCP/IP), or another type of protocol where data packets are transmitted in bulk, a failure to transmit one or more data packets within the bulk of data packets may require the network interface to re-transmit the entire bulk of data packets. Furthermore, projection of power consumption by a network interface may be based on a combination of conditions and measurements discussed herein.

A power profile may include one or more values of power consumption based on hardware calibrations of a corresponding network interface and/or projections of power consumption by the corresponding network interface. Example values of power consumption based on hardware calibrations and/or projections of power consumption include instantaneous power consumption value of the network interface, the network interface's power consumption value over a period of time (e.g., a cool down period before the process to select a power efficient network interface is repeated), the network interface's average power consumption for performing a specific task (e.g., streaming a movie having a specific size), etc. Power cost associated with a "hand off" mode may differ depending on the network interfaces that are engaged in the "hand off" mode. In one example, the power cost associated with a "hand off" mode between WiFi and WiMax may be different than power cost associated with a "hand off" mode between WiFi and CDMA. Furthermore, power cost associated with a "hand off" mode may also depend on the location of the electronic device.

A power profile for a network interface that is not an active network interface may also include a threshold value that is based on projected power cost to the electronic device in a "hand off" mode, where the non-active network interface is activated and data transfer by any other active network interface is suspended after the non-active network interface has been activated. Power cost associated with the "hand off" mode includes power cost to activate the non-active network interface, and power cost to suspend data transfer by other active network interfaces. Power cost may also be associated with running both the non-active network interface and any other active network interfaces to ensure a smooth transition of network interfaces.

In step 208, the electronic device determines a power efficient network interface for data transfer from the one or more network interfaces, based on the one or more obtained power profiles. A power efficient network interface may be a network interface that costs the electronic device the least amount of power for data transfer at a particular geographical location and at a particular time, where power cost associated with entering into a "hand off" mode is accounted for. One or more applications running on the electronic device may determine a power efficient network interface for data transfer based on the one or more obtained power profiles.

In a case where no network interface is active, the electronic device may determine a power efficient network interface by comparing the instantaneous power consumption values of the one or more network interfaces and designating the network interface having the lowest instantaneous power consumption value as the power efficient network. The electronic device may also determine a power efficient network interface by comparing the network interfaces' power consumption values over a period of time (e.g., power consumption by a network interface between consecutive repetitions of the process to select a power efficient network interface). The electronic device may also determine a power efficient network interface by comparing the network interfaces' average power consumption for performing a specific task.

In a case where a network interface is active, the electronic device may determine a power efficient network interface by comparing the instantaneous power consumption values of the one or more network interfaces. The electronic device may designate a non-active network interface as the power efficient network interface if the instantaneous power consumption value of the non-active network interface is the lowest among instantaneous power consumption values of the one or more network interfaces, and is also lower than instantaneous power consumption value of the active network interface by a threshold value that is based on projected power cost to the electronic device in a "hand off" mode. However, if none of the non-active network interfaces has an instantaneous power consumption value that is lower than instantaneous power consumption values of the active network interfaces by a threshold value, then the active network interface is designated as the power efficient network interface.

In a case where a network interface is active, the electronic device may also determine a power efficient network interface by comparing power consumption values of the one or more network interfaces over a period of time. The electronic device may designate a non-active network interface as the power efficient network interface if the power consumption value of the non-active network interface over the period of time is lowest among power consumption values of the one or more network interfaces over a period of time, and is lower than the power consumption value of the active network interface over the period of time by a threshold value that is based on projected power cost to the electronic device in a "hand off" mode. However, if none of the power consumption values of the non-active network interfaces over a period of time is lower than the power consumption value of the active network interface over the same period of time by a threshold value, then the active network interface is designated as the power efficient network interface.

The threshold value may include power cost associated with activating a non-active network interface, and power cost associated with suspending data transfer by the active network interface that is not the power efficient network interface. The threshold value may also include power cost associated with having to simultaneously keep multiple network interfaces active during the "hand off" mode to ensure a smooth transition from different network interfaces and limit interruption of data transfer during the "hand off" mode.

In a case where a network interface is active, the electronic device may designate a non-active network interface as the power efficient network interface if the non-active network interface has a theoretical bandwidth that can handle data transfer required by the electronic device. However, if none of the non-active network interfaces has sufficient bandwidth to handle data transfer required by the electronic device, then the active network interface is designated as the power efficient network interface.

In step 210, the electronic device determines if the power efficient network interface is activated for data transfer. One or more applications running on the electronic device may determine a power efficient network interface is activated for data transfer. If the determined power efficient network interface is active for data transfer, the electronic device proceeds to step 216 and takes no further action for a predetermined time, after which, the electronic device proceeds to step 202. The amount of time the electronic device spends in step 216 may be based on a number of factors including power cost associated with the process for selecting a power efficient network interface as well as interruption of data transfer during this process. If the determined power efficient network interface is not the active network interface, the electronic device activates the power efficient network interface for data transfer in step 212 and proceeds to step 214.

In step 214, the electronic device suspends data transfer by the active network interface after the power efficient network interface has been activated. The electronic device may delay suspension of data transfer by the active interface for a duration of time to maintain a smooth transition and to limit loss or interruption of data transfer during the "hand off" process. Steps 212 and 214 may also be performed by one or more applications running on the electronic device. The electronic device then proceeds to step 216, takes no further action for a predetermined time, after which the electronic device proceeds to step 202 and repeats the process for selecting a power efficient network interface. Alternatively, the electronic device may also end the process if the electronic device determines that the power efficient network interface is active for data transfer in step 210 or after the electronic device suspends data transfer by the active network interface in step 214.

Figure 3:
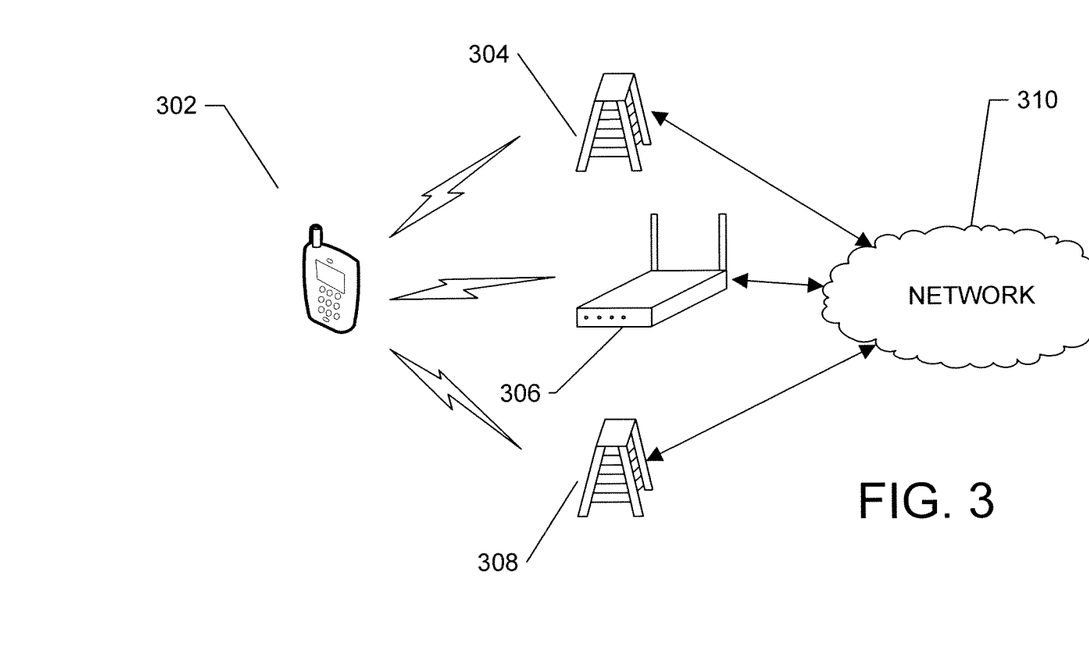
FIG. 3 is an example illustration for providing a power efficient network interface for data transfer between an electronic device and network.

FIG. 3 is an example illustration for providing a power efficient network interface for data transfer between an electronic device and network. Electronic device 302 is depicted as a smartphone device 302 in FIG. 3. Electronic device may also be a tablet computer, a PDA, a portable media player, a desktop computer, or another computing device (e.g., any of the electronic devices 102, 104, or 106). In some examples, electronic device 302 may be any machine with components (e.g., hardware components) to provide one or more network interfaces. Example network interfaces include WiFi, WiMax, 3G, CDMA, Ethernet, etc.

Electronic device 302 may connect to network 310 via network devices 304, 306, or 308. Network devices 304, 306, or 308 may be any system or device having communications capabilities to relay data between electronic device 302 and network 310. Example networking devices may include access points, routers, signal transceivers, etc. Networking device 304, 306, or 308 may be a single networking device, or may include multiple networking devices that are configured to relay data between electronic device 302 and the network 310. In the example of FIG. 3, networking device 304 is depicted as a CDMA cell site, networking device 306 is depicted as a WiFi router, and network device 308 is depicted as a WiMax cell site.

Electronic device 302 may periodically detect on the electronic device, one or more network interfaces for data transfer. Upon detecting the one or more network interfaces for data transfer, electronic device 302 identifies an active network interface from the one or more network interfaces, where the active network interface is active for data transfer. In FIG. 3, electronic device's network interface for providing CDMA is active and network interfaces for providing WiFi and WiMax are on standby mode.

Electronic device 302 obtains one or more power profiles corresponding to the network interfaces for providing CDMA, WiFi and WiMax. Electronic device 302 may conduct hardware calibrations of power drain across each of the network interfaces. Furthermore, electronic device 302 may also obtain a projection of power consumption of each of the network interfaces. For example, electronic device 302 may determine signal strength of each of the network interfaces at the electronic device's physical location and obtain a projection of power consumption by each of the network interfaces based on the signal strength of each of the network interfaces. In another example, electronic device 302 may determine rate of data transfer by each of the network interfaces for providing CDMA, WiFi and WiMax and obtain a projection of power consumption by each of the network interfaces based on rate of data transfer. In another example, electronic device 302 may determine network congestion experienced by network devices 304, 306, or 308 and obtain a projection of power consumption based on network congestion of the respective network devices.

The power profiles for each of the network interfaces may be based on a combination of several projections of power consumption and/or a combination of hardware calibration and one or more power projections. The power profiles for each of the network interfaces may include a corresponding network interface's instantaneous power consumption. The power profiles of each of the network interfaces may also include a corresponding network interface's power consumption value over a period of time.

Electronic device 302 may determine, based on the one or more obtained power profiles, one of the network interfaces for providing WiFi CDMA, and WiMax as a power efficient network interface. In one example, where the instantaneous power consumption value of the network interface for providing WiFi is the lowest among instantaneous power consumption values corresponding to the network interfaces for providing WiFi CDMA, and WiMax, and if the instantaneous power consumption value of the network interface for providing WiFi is lower than instantaneous power consumption value of the active network interface for providing CDMA by a threshold value, then the network interface for providing WiFi is designated as the power efficient network. The threshold value is calculated based on power cost associated with activating a non-active network interface, power cost associated with subsequently suspending data transfer by the active network interface that is not the power efficient network, and/or maintaining both interfaces to ensure a smooth transition. Alternatively, the network interface for providing CDMA is designated as the power efficient network interface if no other network interface has an instantaneous power consumption level lower than that of the network interface for CDMA by the threshold value. In another example, if none of the electronic device's network interfaces is identified as an active network interface, then the power efficient network interface is the network interface with the lowest instantaneous power consumption value.

Where the power efficient network interface is the active network interface, electronic device 302 takes no action. However, in a case where the determined power efficient network interface is not the active network interface electronic device 302 activates the power efficient network interface for data transfer. Electronic device 302 then suspends data transfer by the active network interface, after the power efficient network interface has been activated. For example, where the network interface for CDMA is the active network interface but the network interface for providing WiFi has been deemed as the power efficient network interface), electronic device 302 activates the network interface for providing WiFi. The activated network interface for WiFi establishes communication with the network device for WiFi 306. Communication between the electronic device's network interface for CDMA and the network device for CDMA 304 is maintained to ensure a smooth transition from CDMA to WiFi. Finally, after communication between electronic device 302 and the network device for WiFi 306 has been established, the network interface for providing CDMA is suspended. Electronic device 302 then waits for a predetermined period of time before repeating the process for selecting a power efficient network interface. The duration of the wait period is based on a number of factors including power cost associated with the process for selecting a power efficient network interface as well as interruption of data transfer during this process.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
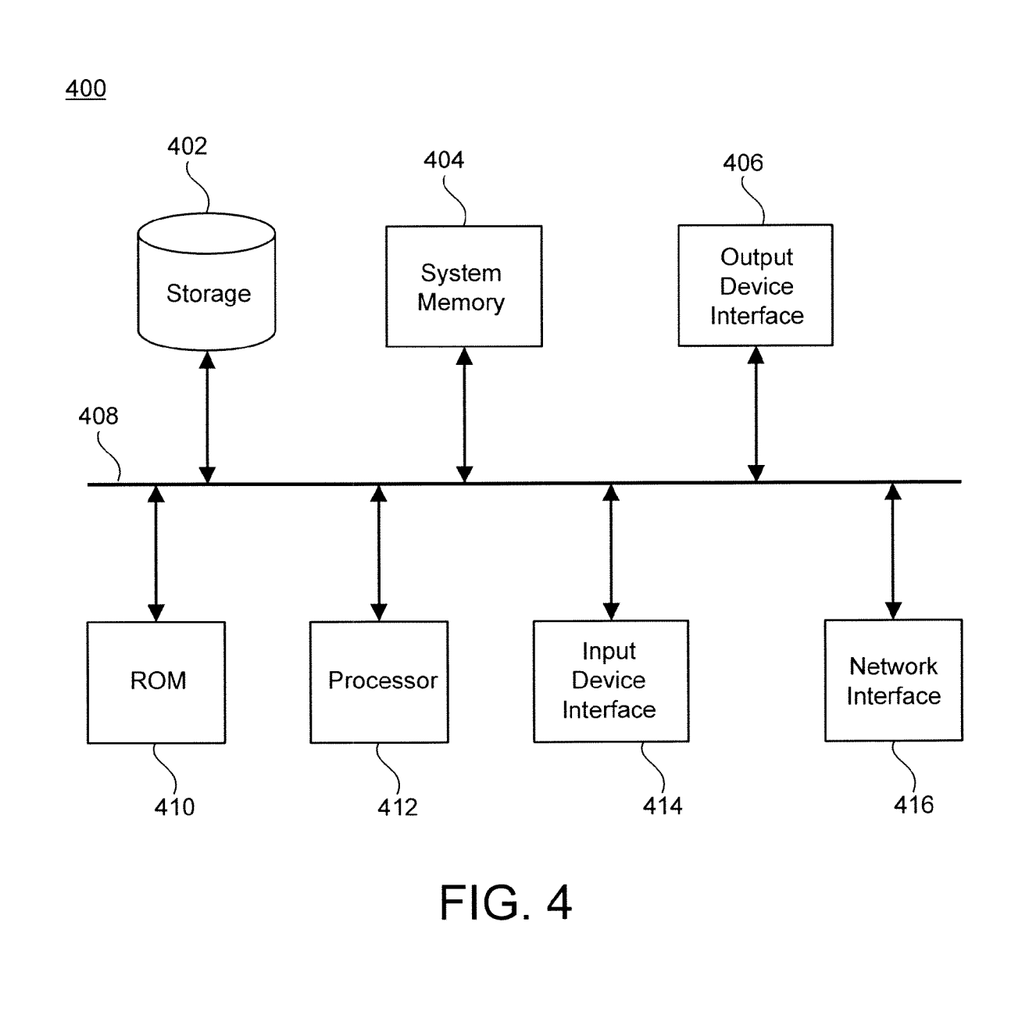
FIG. 4 conceptually illustrates an electronic system with which some implementations of the subject technology are implemented.

FIG. 4 conceptually illustrates an electronic system with which some implementations of the subject technology are implemented. Electronic system 400 can be a laptop computer, a desktop computer, smartphone, PDA, a tablet computer or any other sort of device 102, 104, and 106. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's electronic device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to an electronic device (e.g., for purposes of displaying data to and receiving user input from a user interacting with the electronic device). Data generated at the electronic device (e.g., a result of the user interaction) can be received from the electronic device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for selecting a power efficient network interface, the method comprising:
   detecting, on an electronic device, one or more network interfaces for data transfer;
   identifying an active network interface from the one or more network interfaces, wherein the active network interface is active for data transfer;
   obtaining one or more power profiles corresponding to the one or more network interfaces, wherein each of the one or more power profiles comprises a power cost associated with activating the respective network interface, wherein the power cost includes power used to activate a non-active network interface, power used to maintain data transfer while the non-active network interface is being activated, and power used to deactivate one or more network interfaces, wherein at least a portion of a power profile of a network interface is obtained by a hardware calibration of power drain across the network interface;
   determining a power efficient network interface for data transfer from the one or more network interfaces, based on the one or more obtained power profiles;
   in a case where the determined power efficient network interface is not the active network interface;
      activating the power efficient network interface for data transfer; and
      suspending data transfer by the active network interface after the power efficient network interface has been activated.

2. The computer-implemented method of claim 1, wherein the one or more network interfaces comprise WiFi, WiMax, 3G, CDMA, or Ethernet.

3. The computer-implemented method of claim 1, wherein the detecting, the identifying, the obtaining, the determining, the activating, and the suspending are performed by an application running on the electronic device.

4. The computer-implemented method of claim 1, wherein the detecting, the identifying, the obtaining, the determining, the activating, and the suspending are repeatedly performed at a predetermined frequency.

5. The computer-implemented method of claim 1 wherein the power drain is based on potential difference across a resistor connected to the network interface and a resistance value of the resistor.

6. The computer-implemented method of claim 1, wherein a power profile of a network interface comprises a projection of power consumption by the network interface.

7. The computer-implemented method of claim 6, wherein the projection of power consumption of the network interface is based on signal strength of the network interface.

8. The computer-implemented method of claim 6, wherein the projection of power consumption of the network interface is based on the network interface's rate of data transfer.

9. The computer-implemented method of claim 6, wherein the projection of power consumption of the network interface is based on data segment size.

10. The computer-implemented method of claim 6, wherein the projection of power consumption of the network interface is based on network congestion.

11. The computer-implemented method of claim 6, wherein the projection of power consumption of the network interface is based on the network interface's rate of successful data transfer.

12. The computer-implemented method of claim 1, wherein each of the one or more power profiles comprise a corresponding network interface's instantaneous power consumption value.

13. The computer-implemented method of claim 12, wherein the determining a power efficient network further comprises:
in a case where none of the one or more network interfaces is active for data transfer,
comparing the instantaneous power consumption values of the one or more network interfaces; and
designating a network interface of the one or more network interfaces having the lowest instantaneous power consumption value as the power efficient network interface.

14. The computer-implemented method of claim 12, wherein the determining a power efficient network further comprises:
in a case where a network interface is the active network interface,
comparing the instantaneous power consumption values of the one or more network interfaces;
designating a non-active network interface as the power efficient network interface if the instantaneous power consumption value of the non-active network interface is lowest among instantaneous power consumption values corresponding to the one or more network interfaces, and if the instantaneous power consumption value of the non-active network interface is lower than the active network interface's instantaneous power consumption value by a threshold value; and
designating the active network interface as the power efficient network interface if the instantaneous power consumption value of the non-active network interface is not lower than the active network interface's instantaneous power consumption value by the threshold value.

15. The computer-implemented method of claim 14, wherein the threshold value is based on power cost associated with activating the non-active network interface and power cost associated with suspending data transfer by the active network interface that is not the power efficient network interface.

16. The computer-implemented method of claim 1, wherein each of the one or more power profiles comprise a corresponding network interface's power consumption value over a period of time.

17. The computer-implemented method of claim 16, wherein the determining a power efficient network further comprises:
in a case where a network interface is the active network interface,
comparing the power consumption values of the one or more network interfaces over a period of time;
designating a non-active network interface as the power efficient network interface if the power consumption value of the non-active network interface over the period of time is lower than the power consumption value of the active network interface over the period of time by a threshold value, and if the power consumption value of the non-active network interface over the period of time is lowest among power consumption values of corresponding to the one or more network interfaces over the period of time; and
designating the active network interface as the power efficient network interface if the power consumption value of the non-active network interface over the period of time is not lower than the power consumption value of the active network interface over the period of time by the threshold value.

18. The computer-implemented method of claim 17, wherein the threshold value is based on power cost associated with activating the non-active network interface and power cost associated with suspending data transfer by the active network interface that is not the power efficient network interface.

19. A system for selecting a power efficient network interface, the system comprising:
one or more processors, and
a machine-readable medium comprising instructions stored therein, which when executed by the processors, cause the processors to perform operations comprising:
detecting, on an electronic device, one or more network interfaces for data transfer;
identifying an active network interface from the one or more network interfaces, wherein the active network interface is active for data transfer;
obtaining one or more power profiles corresponding to the one or more network interfaces, wherein a power profile of a network interface is obtained by a hardware calibration of power drain across the network interface, wherein the one or more power profiles comprise instantaneous power consumption values of the corresponding one or more network interfaces, determining a power efficient network interface for data transfer from the one or more network interfaces, based on an instantaneous power consumption value of the network interface; and
in a case where the determined power efficient network interface is not the active network interface;
activating the power efficient network interface for data transfer; and
suspending data transfer by the active network interface after the power efficient network interface has been activated.

20. The system of claim 19, wherein the detecting, the identifying, the obtaining, the determining, the activating, and the suspending are repeatedly performed at a predetermined frequency.

21. The system of claim 19, wherein the power profile of the network interface includes a projection of power consumption by the network interface.

22. The system of claim 19, wherein each of the one or more power profiles comprise a corresponding network interface's power consumption value over a period of time.

23. The system of claim 19, wherein the determining a power efficient network further comprises:
in a case where none of the one or more network interfaces is active for data transfer,
comparing the instantaneous power consumption values of the one or more network interfaces; and
designating a network interface of the one or more network interfaces having the lowest instantaneous power consumption value as the power efficient network.

24. The system of claim 19, wherein the determining a power efficient network further comprises:

in a case where a network interface is the active network interface,
> comparing the instantaneous power consumption values of the one or more network interfaces;
> designating a non-active network interface as the power efficient network interface if the instantaneous power consumption value of the non-active network interface is lowest among instantaneous power consumption values corresponding to the one or more network interfaces, and if the instantaneous power consumption value of the non-active network interface is lower than the active network interface's instantaneous power consumption value by a threshold value; and
> designating the active network interface as the power efficient network interface if the instantaneous power consumption value of the non-active network interface is not lower than the active network interface's instantaneous power consumption value by the threshold value.

25. The system of claim 24, wherein the threshold value is based on power cost associated with activating the non-active network interface, and power cost associated with suspending data transfer by the active network interface that is not the power efficient network.

26. A non-transitory computer-readable medium comprising instructions stored therein, which when executed by a system, cause the system to perform operations comprising:
> detecting, on an electronic device, one or more network interfaces for data transfer;
> identifying an active network interface from the one or more network interfaces, wherein the active network interface is active for data transfer;
> obtaining one or more power profiles corresponding to the one or more network interfaces comprising:
>> obtaining a hardware calibration of power drain across the network interface;
>> wherein the one or more power profiles corresponding to the one or more network interfaces comprise instantaneous power consumption values of the corresponding one or more network interfaces,
>
> determining a power efficient network interface for data transfer from one or more network interfaces, based on an instantaneous power consumption value of the network interface; and
> in a case where the determined power efficient network interface is not the active network interface;
>> activating the power efficient network interface for data transfer; and
>> suspending data transfer by the active network interface after the power efficient network interface has been activated.

* * * * *